Figure 1:
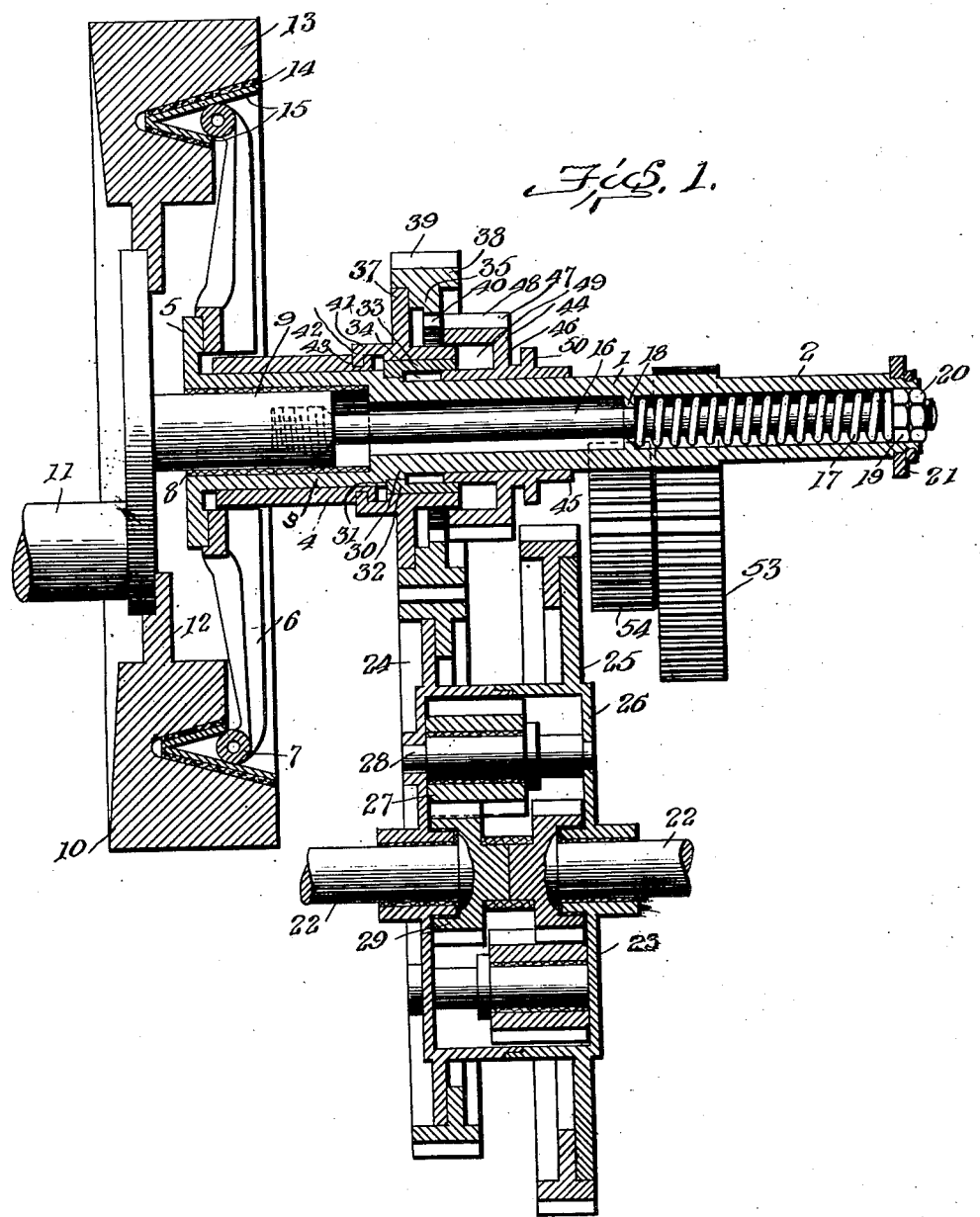

No. 870,107. PATENTED NOV. 5, 1907.
E. KOEB.
TRANSMISSION GEAR.
APPLICATION FILED SEPT. 10, 1906.

5 SHEETS—SHEET 1.

Witnesses
G. Howard Walmsley.
Edward L. Reed

Inventor
Emil Koeb,
By H. A. Toulmin,
Attorney

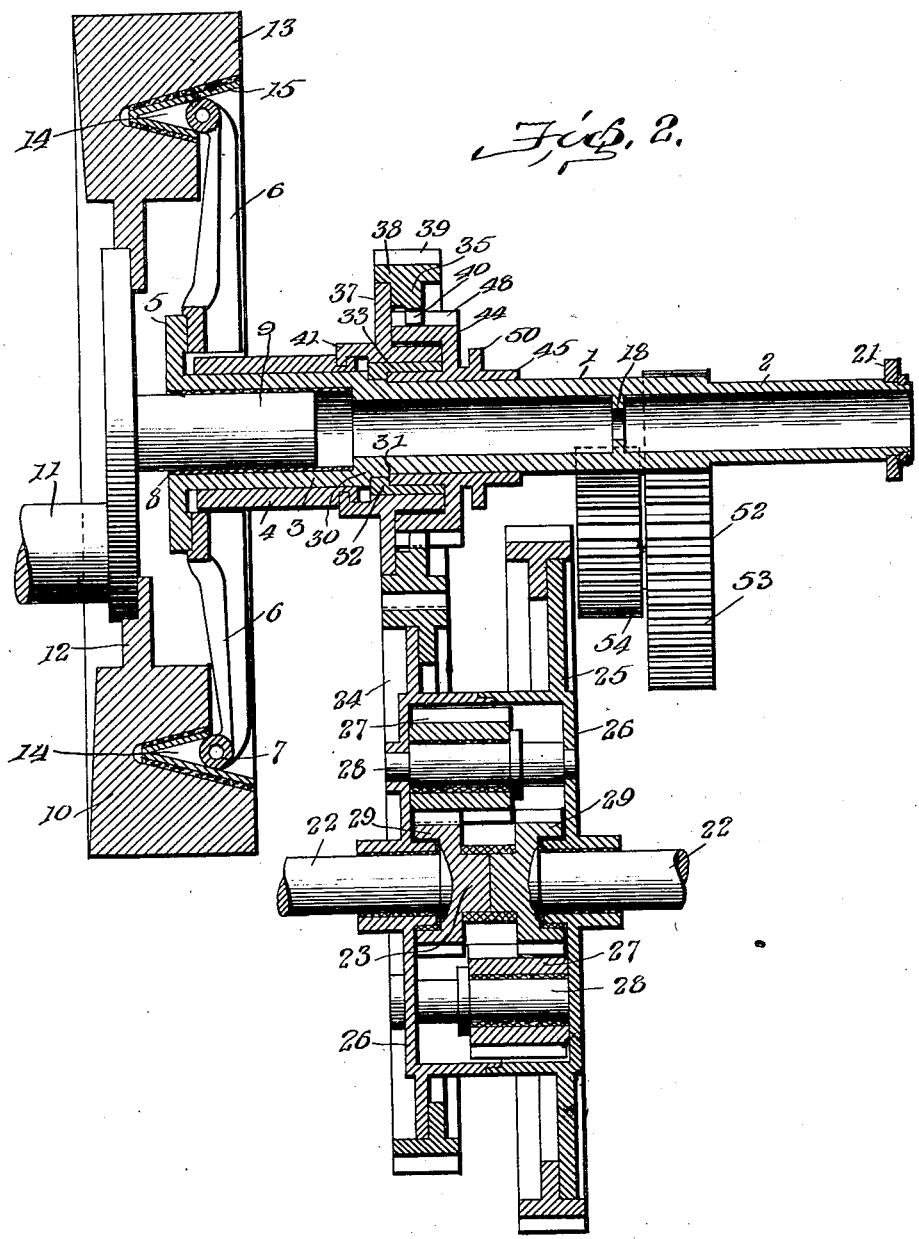

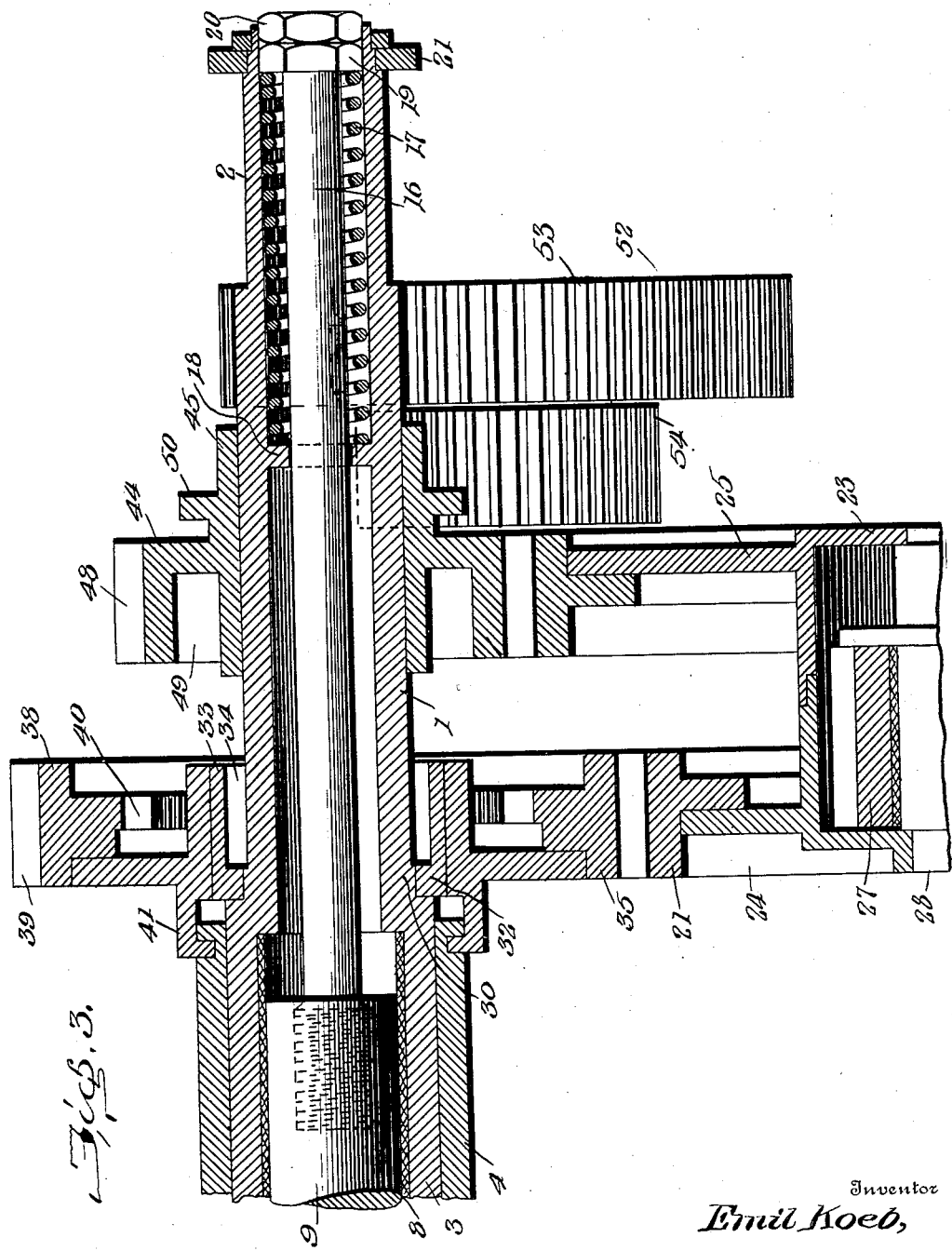

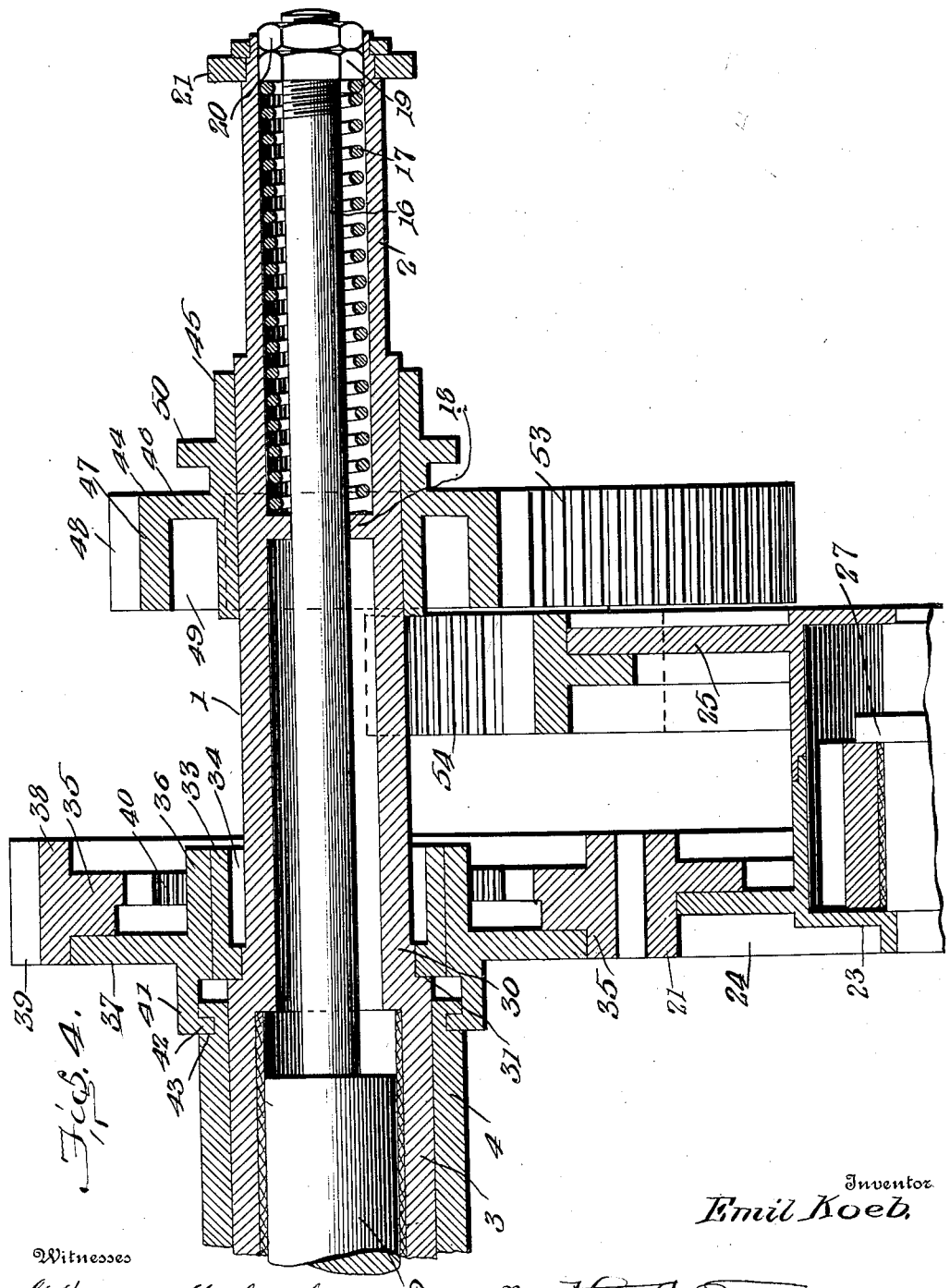

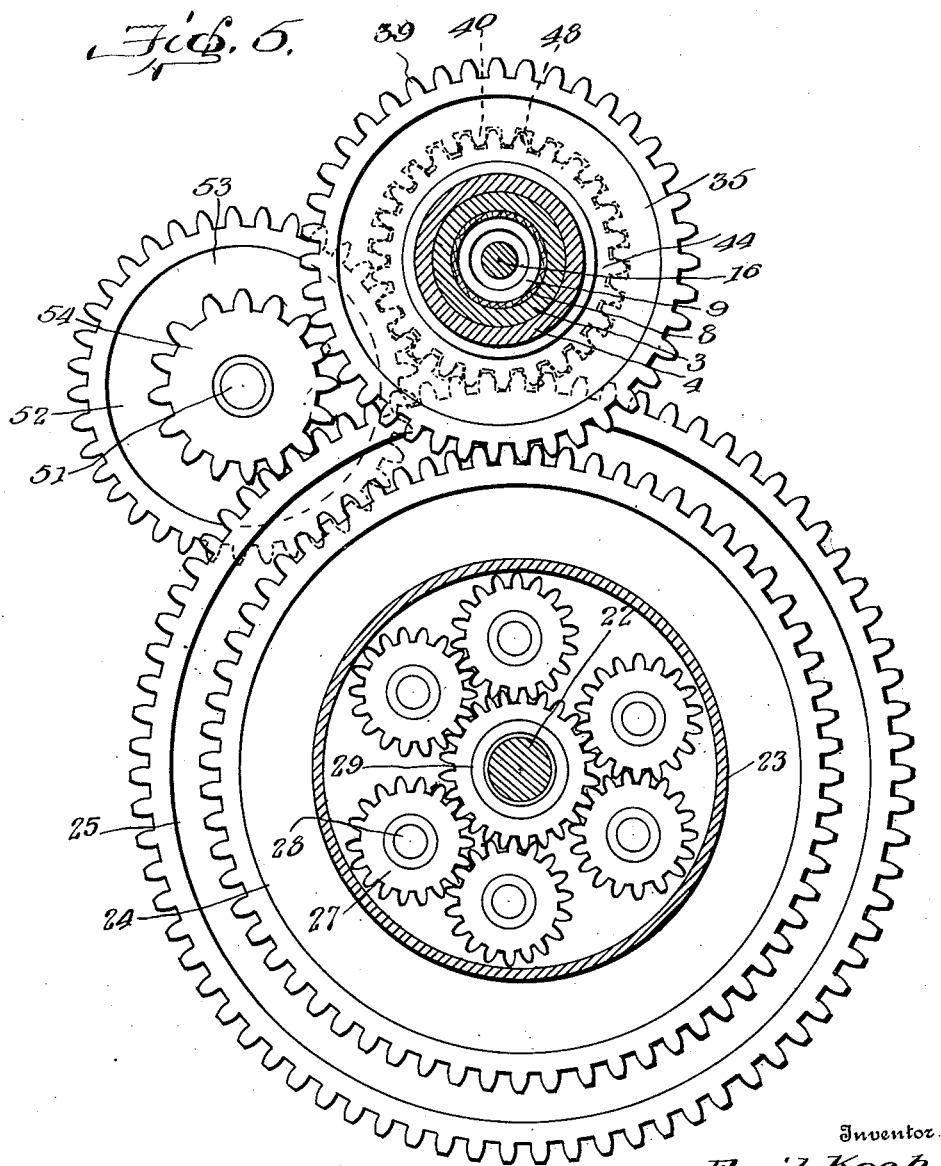

UNITED STATES PATENT OFFICE.

EMIL KOEB, OF LEIPSIC, OHIO, ASSIGNOR OF ONE-HALF TO RALPH P. THOMPSON, OF SPRINGFIELD, OHIO.

TRANSMISSION-GEAR.

No. 870,107.  Specification of Letters Patent.  Patented Nov. 5, 1907.

Application filed September 10, 1906. Serial No. 333,879.

*To all whom it may concern:*

Be it known that I, EMIL KOEB, a citizen of the United States, residing at Leipsic, in the county of Putnam and State of Ohio, have invented certain new and useful Improvements in Transmission-Gears, of which the following is a specification, reference being had therein to the accompanying drawings.

My invention relates to transmission gears, and more particularly to that type of transmission gear which is used in automobiles.

The object of the invention is to provide a transmission gear of this type which will be compact in its arrangement, so that it will occupy but little room on the vehicle, and which will be strong and durable in construction and simple in its operation.

With these objects in view my invention consists of the construction hereinafter described and more particularly pointed out in the claims.

Referring to the accompanying drawings, Figure 1 is a section taken horizontally through the center of the transmission and compensating gears, showing the same in their idle position; Fig. 2 is a similar view, showing the position of the gears when on high speed; Fig. 3 is a horizontal section taken centrally through the transmission gear, showing the position of the same when on low speed; Fig. 4 is a view similar to Fig. 3, showing the gears in reversing position; and Fig. 5 is an end view of the same, showing the relative location of the several gears.

In carrying out my invention in its preferred construction, as shown in the accompanying drawings, I employ a hollow drive shaft 1, having its outer end reduced to form a journal 2 and mounted in a suitable bearing on the frame of the machine, the reduced portion 2 being of greater length than the bearing, to allow the shaft to move longitudinally therein. The opposite end of the shaft has an enlarged portion 3, slidably mounted in a bearing or collar 4, which in turn is carried in a suitable support on the frame of the machine. The inner end of the shaft 1 is provided with a flange 5, extending at right angles thereto and having firmly secured thereto radial arms 6, which are provided at their outer ends with a ring 7, forming one member of a clutch, which will be hereinafter described. The opening in the enlarged portion of the hollow shaft 1 is enlarged to form a bearing 8, which is adapted to receive the shaft or trunnion 9 of the balance-wheel 10, which is operated from the engine through suitable cranks connecting with the wrist-pin 11. The supporting member or web 12 of this balance-wheel is formed at one side of the center of the same, thereby causing the periphery of the balance-wheel to extend inwardly and form an overhanging flange 13 extending a considerable distance beyond the outer end of the bearing 8. Formed in the inner face of this overhanging portion is a substantially V-shaped groove 14, provided with suitable friction surfaces 15 adapted to receive the ring 7 carried by the arms 6, thereby completing the clutch for uniting the two members of the drive shaft. Secured to the inner end of the shaft 9 is a rod 16, which may be formed integral with said shaft, but is preferably formed separate therefrom and has its inner ends screw-threaded to engage with the screw-threaded recess in the end of said shaft. This rod extends throughout the length of the hollow shaft, and is surrounded at its outer end by a coiled spring 17, which bears at its inner end against a flange 18 extending into the hollow shaft and at its opposite end against a nut 19 screw-threaded on the end of the shaft 16 and capable of adjustment on the same to regulate the tension of the spring 17. A jam nut 20 is provided to lock the adjusting nut 19 in its adjusted position. The drive shaft 1 is also provided at its outer end with a collar 21 adapted to connect with a suitable operating mechanism for sliding the shaft longitudinally in its bearings.

Suitably mounted in the frame and parallel with the shaft 1 is a counter-shaft or driven shaft 22, provided with a compensating gear 23, of any suitable type, that shown in the drawings being of the well-known planetary type, having the large and small gear-wheels 24 and 25 on the exterior of the casing 26 and the several pinions 27 carried on the studs 28 within the casing and engaging the pinions 29 on the inner ends of the two sections of the driven shaft 22. The drive shaft 1 is provided immediately adjacent the inner end of the enlarged portion 3 with a stepped up or raised portion 30, of less height than the enlarged portion and forming a shoulder at the end of the same, said shoulder being shown at 31. Rigidly secured to this raised portion 30 is a collar 32, having an enlarged or outwardly extending portion 33 overhanging the reduced portion of the shaft 1 and forming a recess 34 between said overhanging portion of the collar and the shaft. The outer face of this collar and flange forms a bearing surface upon which is rotatably mounted a gear-wheel 35, comprising a sleeve 36 engaging the bearing surface on the collar 32. This sleeve has an outwardly extending web or supporting member 37, which is provided at its outer end with a flange 38 extending parallel with the flange 36 of the sleeve portion. The flange 38 is provided on its outer face with gear teeth 39 and on its inner face with gear teeth 40. On the opposite side of the web 37 is an annular flange 41 having an inwardly extending portion 42, loosely mounted in the recess 43 of the bushing 4, thereby allowing the gear 35 to rotate independently of the shaft 1, but preventing the same from moving longitudinally with said shaft. The outer gear teeth 39 of the gear-wheel 35 are permanently in mesh with the smaller or high speed gear 24 of the compensating gear 23. Mounted on the shaft 1, so as to rotate therewith, but having a free sliding movement longitudinally thereof, is a drive pinion 44, comprising a sleeve 45, suitably keyed to the shaft 1, and provided near its center with an outwardly extending flange 46, provided with an overhanging portion 47 having gear teeth 48 formed on the outer periphery thereof and forming a recess 49 between said overhanging portion and the inner end of the sleeve 45. The opposite end of the sleeve is provided with an annular ring 50, adapted to be engaged by suitable operating mechanism for sliding the driving pinion 44 longitudinally of the shaft 1. When the drive pinion 44 is in its innermost or high speed position, the inner end of the sleeve 45 is within the recess 34 and the teeth 48 are in mesh with the inner teeth 40 of the gear-wheel 35, and the overhanging portion 33 and the sleeve 36 of the gear-wheel are within the recess 49 of the drive pinion 44, thereby forming a substantial one-piece gearing rotating and driving the gear 24.

To put the machine on low speed, the drive pinion is slid along the shaft 1 until the teeth 48 mesh with the teeth of the large or low speed pinion 25 of the compensating gear, thereby driving this gear directly from the shaft. The drive gear being out of engagement with the gear 35, allows that gear to remain stationary or to move at the same speed with the small gear 24 of the compensating gear with which it is in mesh, regardless of the speed of the shaft 1. When it is desired to bring the driven mechanism to a stop while the engine is running, the pinion 44 is brought to an intermediate position, shown in Fig. 1, where it is out of mesh with both gears of the compensator.

Mounted in the frame of the machine, at a lower level than the shafts 1 and 22, and at a point intermediate of these shafts, is a suitable counter-shaft 51 carrying a reversing gear 52, comprising a large and a small gear 53 and 54 slidably mounted on the shaft 51. In order to reverse the machine the gear 52 is slid along the shaft 51 until the small pinion 54 engages with the large gear 25 of the compensator, and the driving pinion 44 is then slid along the shaft 1 to its outermost position on the same, where it meshes with the large gear 53 of the reversing gear, thereby driving the gear 25 through the medium of the gears 53 and 54, which rotate in unison, in the reverse direction.

The operation of the device as a whole is clear from the description of the operation of the several parts. When it is desired to couple the shaft 1 with the engine, the shaft is shifted longitudinally in its bearings, through the medium of suitable operating mechanism, to bring the members 13 and 7 of the clutch into engagement. The driving pinion 44 is then shifted, through its operating mechanism, to bring that pinion into mesh with the low speed gear of the compensator and, as the machine gains headway, is shifted to bring it into engagement with the gear 35, thereby operating the high speed gear 24 of the compensator and driving the machine at full speed. To reverse the machine, the reversing gear 52 is first shifted to its inner position to bring the gear 54 into engagement with the compensator gear 25 and the pinion 44 is then shifted to its outermost position and into engagement with the large gear 53 of the reversing mechanism, thereby driving the compensator gear 25 in the reverse direction.

I wish it to be understood that I do not desire to be limited to the exact details of construction shown and described, for obvious modifications will occur to a person skilled in the art.

Having thus fully described my invention, what I claim as new and desire to secure by Letters Patent is:—

1. In a device of the character described, the combination, with a driven shaft and high and low speed gears carried thereby, of a driving shaft extending parallel to said driven shaft, a gear rotatably mounted on said driving shaft and having inner and outer teeth, the outer teeth of said rotatable gear being permanently in mesh with said high speed gear, a pinion slidably mounted on said driving shaft and rotating therewith and adapted to engage either the inner teeth of said rotatable gear or to engage said low speed gear, and means for shifting said pinion, substantially as described.

2. In a device of the character described, the combination, with a longitudinally movable driving-shaft and a driven shaft, of a gear carried by said driven shaft, a gear rotatably mounted on said driving-shaft, and having inner and outer teeth formed thereon, said outer teeth meshing with the gear on said driven shaft, a driving pinion mounted to slide on said driving shaft and adapted to engage the inner teeth of said rotatably mounted gear, and means for preventing said rotatably mounted gear from moving longitudinally with said shaft, substantially as described.

3. In a device of the character described, the combination, with a longitudinally movable driving shaft and a driven shaft, of a gear mounted on said driven shaft, a collar secured to said driving shaft and having an overhanging flange formed on the upper edge thereof and forming a recess between said flange and said shaft, a gear rotatably mounted on said collar and having inner and outer teeth formed thereon, said outer teeth meshing with the gear on said driven shaft, means for preventing said gear from moving longitudinally with said shaft, a driving pinion mounted to slide longitudinally of said driving shaft and comprising a sleeve portion adapted to enter said recess, and an overhanging portion provided with teeth adapted to engage the inner teeth of said gear, and means for shifting said driving pinion, substantially as described.

4. In a device of the character described, the combination, with a driving-shaft and a driven shaft, of a gear mounted on said driven shaft, a collar secured to said driving shaft and having an overhanging flange formed on the upper edge thereof and forming a recess between said flange and said shaft, a gear rotatably mounted on said collar and having inner and outer teeth formed thereon, said outer teeth meshing with the gear on said driven shaft, a driving pinion mounted to slide longitudinally of said driving-shaft, and comprising a sleeve portion adapted to enter said recess, and an overhanging portion provided with teeth adapted to engage the inner teeth of said gear, and means for shifting said driving pinion, substantially as described.

5. In a device of the character described, the combination, with a driving-shaft, a driven shaft and high and low speed gears on said driven shaft, of a rotatably mounted gear on said driving shaft permanently in mesh with said high speed gear, a pinion sliding on said driving-shaft adapted to engage with said rotatable gear for operating said high speed gear on the driven shaft and adapted to engage directly with said low speed gear thereon, and means for shifting said pinion, substantially as described.

6. In a device of the character described, the combination, with a driving-shaft, a driven shaft and a high and low speed gearing carried by the driven shaft, of a gear rotatably mounted on said driving-shaft and having inner and outer teeth formed thereon, said outer teeth being permanently in mesh with the high speed gearing of said driven shaft, a driving pinion sliding on said driving shaft and rotating therewith and adapted to engage the inner teeth on said gear for driving said high speed gearing and adapted to engage directly with the teeth of said low speed gearing on said driven shaft, substantially as described.

7. In a device of the character described, the combination, with a driving-shaft, a driven shaft, and high and low speed gears carried by said driven shaft, of a gear rotatably mounted on said driving-shaft and meshing with the high speed gear on said driven shaft, a driving pinion slidably mounted on said driving-shaft and adapted to engage said rotatable gear, a pair of reversing gears slidably mounted beneath said driving gear and having the horizontal plane of their axes of rotation at a point intermediate of the horizontal planes of the axes of rotation of said driving shaft and said driven shaft, one of said gears being adapted to mesh with the low speed gearing on said driven shaft and the second of said reversing gears being adapted to be engaged by said driving pinion, substantially as described.

8. In a device of the character described, the combination, with a driving-shaft, a driven shaft, high and low speed gearing carried by said driven shaft, a gear rotatably mounted on said driving shaft and having inner and outer teeth, said outer teeth meshing with said high speed gearing, and a pinion slidably mounted on said driving shaft and rotating therewith and adapted to engage either the internal teeth on said rotatable gear or said low speed gearing, of a reversing gear comprising a large and a small pinion slidably mounted near said driving and driven shafts and rotating in unison, said small gear being adapted to engage the low speed gearing on said driven shaft, and said large gear being adapted to be engaged by the driving means on said driving-shaft, substantially as described.

9. In a device of the character described, the combination, with a driving means and a clutch member carried thereby, of a hollow driving-shaft capable of a longitudinal sliding movement and a clutch member carried at one end of said shaft, means for shifting said shaft to move said clutch member into and out of engagement with the first mentioned clutch member, means contained within said hollow shaft for holding said clutch members normally in engagement, a driving gear carried by said shaft, a driven gear mounted near the same and an intermediate gear adapted to transmit motion from said driving-shaft to the driven gear, substantially as described.

10. In a device of the character described, the combination, with a balance-wheel, means for driving the same, a trunnion therefor, and a clutch member carried by said balance-wheel, of a driving-shaft capable of a longitudinal sliding movement in its bearings, a clutch member carried at one end of said shaft, a bearing formed in the end of said shaft and adapted to receive said trunnion, means for shifting said shaft to bring said clutch members into engagement, means carried by said shaft and connected to said trunnion for holding said clutch members normally in engagement, a driving gear mounted on said driving-shaft, a driven gear mounted near the same and intermediate gearing for transmitting motion from said driving-shaft to said driven gear, substantially as described.

11. In a device of the character described, the combination, with a balance-wheel and means for driving the same, a trunnion therefor, and a clutch member carried thereby, of a hollow driving-shaft capable of longitudinal movement, a driving gear carried thereby, a clutch member at one end of said shaft, a bearing formed in one end of said shaft and adapted to receive said trunnion, means for shifting said shaft to bring said clutch members into engagement, an extension carried by said trunnion adapted to enter said hollow shaft, and a spring interposed between said extension and said shaft for holding said clutch members normally in engagement, substantially as described.

12. In a device of the character described, the combination, with a balance-wheel, having an annular recess in one face thereof means for driving said balance-wheel and a trunnion therefor, of a hollow driving-shaft capable of longitudinal movement, radial arms secured to one end of said shaft, a ring carried by said arms and adapted to engage the recess in said balance-wheel, a bearing formed in one end of said shaft adjacent to said clutch member and adapted to receive said trunnion, a rod secured to said trunnion and extending through said hollow shaft, a coiled spring surrounding one end of said rod within said shaft, a projection within said shaft engaging one end of said spring, a stop near the outer end of said rod engaging the opposite end of said spring, means for shifting said shaft longitudinally of its bearings, a driven shaft, and means for driving the same from said driving shaft substantially as described.

13. In a device of the character described, the combination, with a balance-wheel, means for driving the same, a trunnion therefor, and a clutch member carried thereby, of a driving-shaft capable of longitudinal movement, a clutch member carried by one end of said shaft, a bearing formed in said shaft and adapted to receive said trunnion, means for holding said clutch members firmly in engagement, means for shifting said shaft longitudinally of its bearings, a driven shaft, high and low speed gears carried by said driven shaft, a gear rotatably mounted on said driving-shaft and engaging the high speed gear on said driven shaft, a pinion rotating with said driving-shaft and sliding thereon and adapted to engage either said rotatable gear or said low speed gear, and means for shifting said pinion, substantially as described.

14. In a device of the character described, the combination, with a driven-shaft and high and low speed gears carried thereby, a driving shaft capable of a sliding movement in a longitudinal direction, a gear rotatably mounted on said driving shaft adapted to engage the high speed gear on said driven shaft, a pinion slidably mounted on said driving shaft and adapted to engage either said rotatable gear or said low speed gear of a clutch mechanism comprising a driving member having a recess in one face thereof, said recess having outwardly diverging walls, a member carried by said driving shaft and adapted to engage said recess, and means for shifting said shaft to bring said members into engagement, substantially as described.

15. In a device of the character described, the combination, with a driven shaft and high and low speed gears carried thereby, a driving shaft capable of a sliding movement in a longitudinal direction, a gear rotatably mounted on said driving shaft adapted to engage the high speed gear on said driven shaft, and a pinion slidably mounted on said shaft and adapted to engage either said rotatable gear or said low speed gear of clutch mechanism comprising a driving member having an annular V-shaped recess in one face thereof, a member carried by said driving shaft and adapted to engage said recess, and means for shifting said shaft to bring said members into engagement, substantially as described.

In testimony whereof, I affix my signature in presence of two witnesses.

EMIL KOEB.

Witnesses:
 H. C. EDWARDS,
 I. E. YARNELL.